Patented Oct. 23, 1951

2,572,708

UNITED STATES PATENT OFFICE 2,572,708

PROCESS OF PREPARING 2-THENYL ALCOHOLS

William S. Emerson and Tracy M. Patrick, Jr., Dayton, Ohio, assignors to Monsanto Chemical Company, St. Louis, Mo., a corporation of Delaware No Drawing. Application February 10, 1948, Serial No. 7,524

4 Claims. (Cl. 260—332.3)

This invention relates to a process of providing 2-thenyl alcohols from the corresponding thenyl halides.

The 2-thenyl alcohols are intermediates for a variety of useful organic compounds. Heretofore no satisfactory commercial methods for their preparation have been available. While it has been proposed to carry out the hydrolysis of organic halides by the aid of either weakly alkaline salts like sodium carbonate or strong alkalies like sodium hydroxide, these methods gave low yields accompanied by the formation of considerable tar and by-products.

In accordance with the present invention it has been discovered that 2-thenyl alcohols may be prepared advantageously by hydrolyzing the 2-thenyl halides in aqueous medium in the presence of alkali or alkaline earth metal salts of mono carboxylic organic acids containing less than five carbon atoms followed by treating for a relatively short period of time with a strong alkali.

In carrying out the process of the invention any suitable 2-thenyl halide may be used as the starting material. Examples comprise 2-thenyl chloride, 2-thenyl bromide, 5-chloro-2-thenyl chloride, 5-chloro-2-thenyl bromide, 5-bromo-2-thenyl chloride, 5-bromo-2-thenyl bromide, 5-methyl-2-thenyl chloride, 5-methyl-2-thenyl bromide. The expression "a thenyl halide" is used generically herein to include 2-thenyl halides and their substitution derivatives.

The first step in the hydrolysis consists in treating the 2-thenyl halide with a weakly alkaline material comprising an alkali or alkaline earth metal salt of a lower alkyl mono carboxylic acid in aqueous medium, the reaction being advantageously expedited by the application of heat. Examples of suitable hydrolytic agents comprise sodium acetate, potassium acetate, calcium acetate, sodium formate, calcium formate, sodium propionate, potassium propionate and sodium butyrate. It is desirable to use at least stoichiometrical amounts of organic acid salt and for best results about two mols of alkali or alkaline earth metal salt of the acid are used per mol of 2-thenyl halide. This mixture in aqueous solution or suspension is then refluxed for a period of about one to three hours. There is then added a stronger alkali as for example a strong inorganic alkali such as potassium hydroxide and heating continued for a short time. The amount of strong alkali may vary widely and in general may be within the range of one to three mols per mol of 2-thenyl halide in the original charge. Most favorable results have been obtained using 1.5 mols of sodium hydroxide per mol of 2-thenyl halide. Refluxing for fifteen minutes in the presence of the strong alkali is generally sufficient.

After the hydrolysis has been completed, the thenyl alcohol may be recovered by extracting the aqueous layer with a water immiscible solvent, by distillation or by a combination of these steps.

It will be noted that the hydrolysis is carried out in two distinct steps. In the first step the 2-thenyl halide usually is converted nearly quantitatively to a mixture of 2-thenyl alcohol and a 2-thenyl ester of the hydrolytic agent. In the second step the ester is hydrolyzed and possibly a further quantity of the 2-thenyl halide. However, the invention is not limited to any theory of the mechanism of the reaction. The reactions may be carried out at slightly elevated temperatures or even at room temperature, but for best results and short time cycles the reaction mixtures are heated to boiling temperature.

The following examples illustrate the invention in detail and are not to be construed in a limiting sense.

Example 1

A vigorously stirred mixture of 66.3 g. of 2-thenyl chloride, 82.0 g. of anhydrous sodium acetate, and a trace of a synthetic non-ionic wetting agent in 500 ml. of water was boiled under reflux for one hour. The mixture was cooled and 30 g. of solid sodium hydroxide was added. Boiling was then continued for fifteen minutes. The mixture again was cooled. The aqueous layer was separated and extracted three times with benzene. The extracts were combined with the organic layer, dried over anhydrous potassium carbonate, and then distilled. In addition to benzene, there was obtained 44.0 g. (77% yield) of 2-thenyl alcohol, B. P. 97–102°/13 mm., $n_D^{25}$ 1.5612.

Pure 2-thenyl alcohol boiled at 95.7–96.1°/12 mm., $n_D^{25}$ 1.5630. Calcd. for $C_5H_6OS$: 28.09 S; found: 28.05, 28.20% S.

A higher boiling by-product obtained in varying amount in each of the alkaline hydrolysis runs was found to consist largely of 2-thenyl ether. When pure it boiled at 120–125°/1 mm., M. P. 38–39°. Calcd. for $C_{10}H_{10}OS$: 30.51% S; found: 29.79, 30.12% S.

When aqueous sodium carbonate or bicarbonate is used instead of sodium acetate considerable amounts of by-products and tars are formed.

Example II

A vigorously stirred mixture of 50.1 g. of 5-chloro-2-thenyl chloride, 49.2 g. of anhydrous sodium acetate, a trace of a synthetic non-ionic wetting agent, and 300 ml. of water was boiled under reflux for one hour. The mixture was cooled and 30 g. of sodium hydroxide was added. The mixture was then heated to reflux for another thirty minutes. After cooling, the aqueous layer was separated and extracted three times with benzene. The combined extracts and organic layer were dried over anhydrous sodium sulfate, and then distilled. There was obtained 28.3 g. (64% yield) of 5-chloro-2-thenyl alcohol, B. P. 121–126°/15 mm., $n_D^{25}$, 1.5695, and 10.8 g. (26% yield) of 5-chloro-2-thenyl ether, B. P. 126°/15 mm.–208°/14 mm. (mostly 205–208°/14 mm.), $n_D^{25}$ 1.5907.

The attempt was made to substitute 44.5 g. of calcium hydroxide for sodium acetate in the above procedure but the yield was considerably lower.

Example III

A mixture of 13.3 g. of 5-methyl-2-thenyl chloride and 20 g. of anhydrous sodium acetate in 100 ml. of water was stirred and boiled under reflux for forty-five minutes. The mixture was then cooled and 5 g. of solid sodium hydroxide was added. Boiling was then continued for fifteen minutes. After the hydrolysis mixture had been cooled again, it was extracted four times with benzene. The combined extracts were washed with water and then dried over anhydrous potassium carbonate. Distillation of the benzene solution gave, in addition to solvent, 6.8 g. (58% yield) of 5-methyl-2-thenyl alcohol, B. P. 106–110°/13 mm., $n_D^{25}$ 1.5479. A pure sample boiled at 105–106°/12 mm., $n_D^{25}$ 1.5471, $d_{25}^{25}$ 1.1409

Calcd. for $C_6H_8OS$: 25.01% S; found: 25.04, 24.98% S.

As will be apparent, numerous modifications of the foregoing procedures may be made without departing from the scope and spirit of the invention.

What is claimed is:

1. A process of producing 2-thenyl alcohol which comprises refluxing 2-thenyl chloride in the presence of an aqueous solution of sodium acetate, the molar quantity of sodium acetate being substantially twice that of the 2-thenyl chloride, subsequently adding approximately 1.5 mols of sodium hydroxide per mol of thenyl chloride initially charged and continuing the refluxing.

2. A process which comprises treating a 2-thenyl chloride with an alkaline material selected from the class consisting of the alkali and alkaline earth metal salts of one to four carbon atom monocarboxylic acids, said treatment being carried out by heating said 2-thenyl chloride in the presence of a water solution of said metal salts at the reflux temperature and then adding an alkali metal hydroxide to said water solution, the amount of alkali metal hydroxide added being from one to three moles per mole of said 2-thenyl chloride initially present and refluxing said solution to form a 2-thenyl alcohol.

3. A process of producing a 2-thenyl alcohol which comprises refluxing a 2-thenyl chloride in the presence of an aqueous solution of sodium acetate, the molar quantity of said sodium acetate being substantially twice that of the said 2-thenyl chloride, subsequently adding approximately 1.5 moles of sodium hydroxide per mole of thenyl chloride initially present and refluxing said solution to form a 2-thenyl alcohol.

4. A process of producing 2-thenyl alcohol which comprises refluxing for a period of about one to three hours 2-thenyl chloride in an aqueous solution of sodium acetate, the molar quantity of said sodium acetate being substantially twice that of the said 2-thenyl chloride, subsequently adding approximately 1.5 moles of sodium hydroxide per mole of 2-thenyl chloride initially present and refluxing said solution for fifteen minutes.

WILLIAM S. EMERSON.
TRACY M. PATRICK, Jr.

REFERENCES CITED

The following references are of record in the file of this patent:

Cannizaro: Ann. 96, 246–247 (1855).
Richter: "Organic Chemistry," pp. 649–659, Wiley, N. Y., 1938.